… ……

United States Patent [19]

Baur et al.

[11] 4,327,970
[45] May 4, 1982

[54] DISPLAY DEVICE FOR OPTICALLY REPRESENTING INFORMATION AND A METHOD OF OPERATION

[75] Inventors: Guenter Baur, Freiburg; Hans Kohlmueller, Erlangen; Hans Krueger, Munich, all of Fed. Rep. of Germany

[73] Assignee: Siemens Aktiengesellschaft, Berlin & Munich, Fed. Rep. of Germany

[21] Appl. No.: 131,224

[22] Filed: Mar. 17, 1980

[30] Foreign Application Priority Data

Mar. 21, 1979 [DE] Fed. Rep. of Germany ....... 2911087

[51] Int. Cl.³ ............................................. G05D 25/00
[52] U.S. Cl. .................................................... 350/363
[58] Field of Search ........................ 350/345, 362, 363

[56] References Cited

U.S. PATENT DOCUMENTS

| | | | |
|---|---|---|---|
| 3,743,382 | 7/1973 | Rosenberg | 350/362 |
| 3,998,525 | 12/1976 | Giglia | |
| 4,113,360 | 9/1978 | Baur et al. | 350/345 |
| 4,142,781 | 3/1979 | Baur et al. | 350/345 |
| 4,236,791 | 12/1980 | Krueger et al. | |
| 4,240,717 | 12/1980 | Camlibel | 350/363 |
| 4,264,147 | 4/1981 | Baur et al. | |

*Primary Examiner*—William L. Sikes
*Attorney, Agent, or Firm*—Hill, Van Santen, Steadman, Chiara & Simpson

[57] ABSTRACT

A display device and a method of using the display device characterized by a light trap which includes a member consisting of a material having an index of refraction greater than one and containing fluorescent particles and which light trap collects impinging ambient light by means of fluorescent scattering by the particles and subsequent reflection of the collected light on the boundary surfaces, a plurality of electrodes disposed adjacent the surface of the light trap at selected portions of the surface and a fluid being provided adjacent each of the electrodes so that an application of voltage to selected electrodes causes a precipitate to be formed from the fluid and collected adjacent the selected electrode to create an optical indication and the application of a counter voltage at the selected location causes an erasing of the indication by eliminating the precipitate and placing it back into the fluid. The precipitate may be separated from the fluid by an electrochemical process which may be either a metallic material or an organic electrochromic. The fluid may also be a suspension of particles which particles will be transported to a given location by the application of an appropriate voltage.

16 Claims, 4 Drawing Figures

DISPLAY DEVICE FOR OPTICALLY REPRESENTING INFORMATION AND A METHOD OF OPERATION

BACKGROUND OF THE INVENTION

The present invention is directed to a method and a display device for optically representing information which display device utilizes a light trap with a member containing fluorescent particles and utilizes activating electrodes to couple light from the light trap.

Passive displays, which do not produce any of their own light but only modulate the light of the environment, must be equipped with an additional illumination if they are also intended to display under favorable brightness or illumination conditions. As a rule, this light source consumes current and therefore may adversely effect one of the advantages of a passive display devices which is an extremely low power demand. Therefore, one solution to this problem is to provide a display which can function with as small amount of artificial light as possible.

The problem of providing light for passive displays was solved in a large degree with the development of a so called "fluorescent activated display" commonly referred to a FLAD. In a FLAD, a fluorescent plate is disposed behind a light valve, which can be switched area-wise between a light transmissive and a light blocking state. This plate contains a fluorescent material and has mirrors provided on each of its four narrow edges and is provided with light exit or decoupling windows which may be in the form of notches or indents on a rear surface, which exit windows are aligned with the switchable valve regions of the light valve. The fluorescent plate will collect a large portion of the ambient light, which impinges on it and by means of the fluorescent scattering and subsequent total reflections at the boundary surfaces will conduct this radiation along its interior to the outlet window where it is coupled in a forward direction with increased intensity at the respective light valves. The brightness factor of a fluorescent plate is given in the first approximation by a ratio of the light collecting surface of the plate to the light emitting surface of the plate. Greater details regarding the construction and operation of a FLAD can be obtained from U.S. Pat. No. 4,142,781, which includes the disclosure of German O.S. No. 25 54 226.

The above mentioned type FLAD display devices are provided with good optical qualities, however, it does not have a particularly high efficiency. The fluorescent plate is partially covered by the light valve and therefore has only a relatively small collective surface. In addition, all the switchable valve regions are always provided with fluorescent light and also these regions which are in a light blocking condition will block the impinging light from reaching the fluorescent plate. The valves employed up to the present time operate with polarizers, which will considerably attenuate any light which passes therethrough. Due to these losses, only a moderate efficiency or yield of approximately 30% is obtained.

If, as disclosed in the device of the U.S. Pat. No. 4,113,360, which includes the disclosure of German Offenlegungsschrift No. 26 13 891, the light valve is eliminated and the light capatured in the fluorescent plate is output coupled only at selected locations, the light-up capabilities of the fluorescent plate are better utilized. According to the display devices of this patent, the output coupling windows are created selectively in response to the desired symbols that are to be displayed. This can be accomplished in two ways. In one embodiment, a membrane is moved by means of electrical force into engagement with a rear surface of the fluorescent plate in response to the application of an electrical force and when engaged with the rear surface will cause a light decoupling in the areas of contact. In another embodiment, ferroelectric ceramic plate has its thickness increased by means of an application of a suitable voltage to engage the back of the fluorescent plate to cause decoupling in those areas of contact. Both of these embodiments supply not only a better light intensity representation but also render possible an information storage, however, they are not simple to produce. They require liquid contact films, special spacing techniques, and allow scattering angle distributions within only certain limits. Moreover, the continual flexing of the membrane subjects it to possible damage and in the embodiment using a ferroelectric ceramic materials, relatively high voltages are required.

SUMMARY OF THE INVENTION

The object of the present invention is directed to providing a display device and the method of using the display which are easy to construct and which display devices brings amplification properties of a fluorescent plate to a maximum extent and provides a storage effect. This object is achieved in accordance with the present invention by providing a display device which can be used in a method for optically representing information on the device, the display device having a light trap including a member consisting of material having an index or refraction greater than one and containing fluorescent particles; means providing electrodes at selected portions of the surface of the member of the light trap, and means for providing a fluid adjacent each of said electrodes; collecting impinging light by means of the fluorescent scattering by the fluorescent particles and subsequent reflection on the boundary surfaces of the members of the light trap, writing in information at selected locations by applying a voltage to selected electrodes to create a precipitation from the fluid adjacent the selected electrodes, and erasing the information by applying a counter voltage at the selected electrodes to eliminate the precipitate at the selected location and place it back into the fluid.

The proposed method is able to function without forming a contact mediator between the fluorescent member and the scattering layer. The display device is free of mechanically moving parts and it requires no special distancing or spacing procedures. Moreover, it is advantageous that the optical contact is preserved even when the precipitate is deposited on a rough surface or in a depression. For in this fashion, it is possible to comfortably vary the scattering characteristics of the output coupling radiation and adapt it to the requirements of the individual case. Once the precipitate is produced, it is preserved even after removal of the voltage; however, it can be immediately disintegrated or decomposed again through a connection of a counter voltage.

Normally, the precipitate will be obtained by means of an electrochemical reaction from a liquid electrolyte. It is advisable here to deposit either a metallic layer selected from a metal selected from a group consisting of silver, gold and nickel or an organic electrochromic layer for example, a viologen compound.

However, the precipitate can also be produced in other manners. This technique employing the electrode for electrophoresis-effect also enters into a particular consideration. The fluid receives electrically charged particles, which with the application of a voltage on the electrodes would be collected at one of the electrodes. Such a suspension must be so constituted that the fluorescent light is absorbed or allowed to pass therethrough by the carrier fluid but is dispersed or scattered by the particles.

If the precipitate has a reflection color, which deviates somewhat from the inherent color of the fluorescent plate, then in deed all of the fluorescent light is no longer employed. However, one can obtain a particular high contrast representation.

DESCRIPTION OF THE PREFERRED EMBODIMENTS

Figure 1:
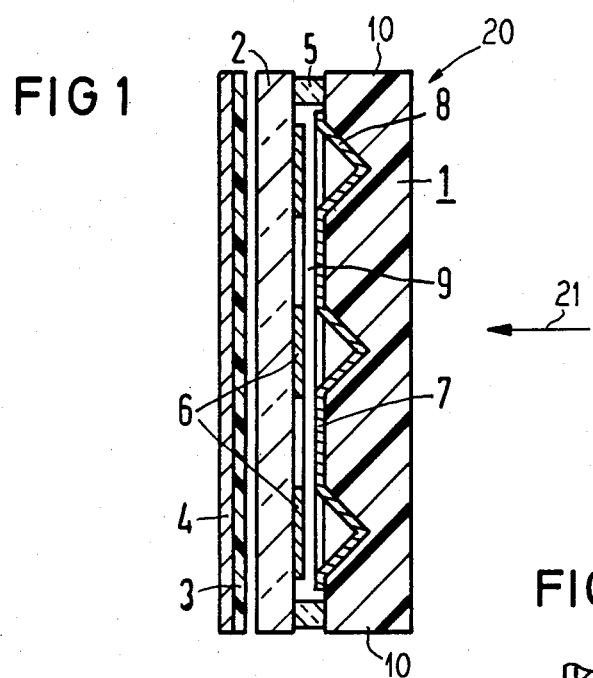
FIG. 1 is a cross sectional view of a display device in accordance with the present invention.

The principles of the present invention are particularly useful when incorporated into a display generally indicated at 20 in FIG. 1.

The display contains a light trap, which is formed by a fluorescent plate 1, a thin rear or back plate 2, a filter foil or sheet 3, and a reflector 4. The parts are arranged in succession in a sequence so that an observer looking in the direction of an arrow 11 will see the front surface of the fluorescent plate 1. The two plates 1 and 2 are spaced closely together by a spacing frame 5 to form a cavity 9. On a surface of the plate 2 facing a back surface of the plate 1, an electrically conductive coatings in the form of segmented electrode 6, which may be individually actuated, are provided. A coating 7 is provided on a back surface of the plate 1 facing the plate 2 and acts as a counter electrode 7. As illustrated, each of the segment electrodes are disposed opposite notches or indentations 8 in the back surface of the fluorescent plate 1 and the segments 6 and the notches 8 are arranged in a conventional figure 8 form. The chamber 9 which is defined by the two plates 1 and 2 and the frame 5 is filled with the fluid such as a transparent electrolyte, which has approximately the same index of refraction as the fluorescent plate 1. The filter foil 3, which is adjacent a back surface of the back plate 2, will function as a high pass filter means which will allow the ambient exciting light for the fluorescent materials of the fluorescent plate 1 to pass through but will absorb or block the passage of the fluorescent light.

In the particular device of FIG. 1, the individual parts have the following substance. The fluorescent plate 1, which has reflective mirror edges 10, consists of a polymethyl methacrylate. The fluorescent material will have dissolved therein a substance which is offered by the Firm Riedel-de Häen under the designation or tradename "K1". The electrodes that are formed by transparent $In_2O_3$ layers and the electrolyte is an $AgNO_3$ solution.

The display device will operate in the following manner. In a switched off or a disconnected state for the segment electrodes 6 and the continuous counter electrodes 7, the notches or indentations 8 are optically nonexistent so that the fluorescent light will remain entrapped within the system consisting of the plate 1 and the electrolyte in the chamber 9. If one of the segment electrodes is activated, then the respective notch or indentations is coated with a metal film such as a silver film and now forms a highly reflective light exit window. With a connection of a counter voltage to the electrode the silver metal precipitate will disappear without any residue. The required switching voltage is approximately three volts and the switching time is in the order of magnitude of 0.1 seconds.

If one should decide to obtain a contrast which corresponds to that of an electrochromic display in the display of the present invention, then the output-coupled fluorescent light must be as bright as standard white given equal ambient conditions. The brightness results through the integration over an eye response curve. If one operates with a fluorescent material K1 then the desired condition is satisfied with normal day light from a source at a temperature of 6000° K. if the ratio between the light collecting surfaces and the greatest output coupling surfaces amounts to 4:1. Given a light source at a temperature of 3000° K., which is artificial light source, the surface ratio must have a magnitude of 9:1.

Figure 2:
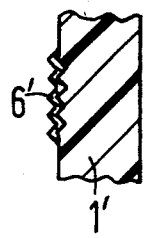
FIG. 2 is a partial cross sectional view of a modification of a display of FIG. 1.
Figure 3:
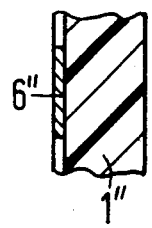
FIG. 3 is a partial cross sectional view showing another modification of the display of FIG. 1.

In FIG. 2, an embodiment is illustrated in which the segment electrode 6' is applied on a rough surface on the back of the fluorescent plate 1' instead of utilizing the notches 8. In FIG. 3 the rear surface of the plate 1" is smooth and the segment electrode 6" are applied on the smooth surface to form the position for the coupling windows.

Figure 4:
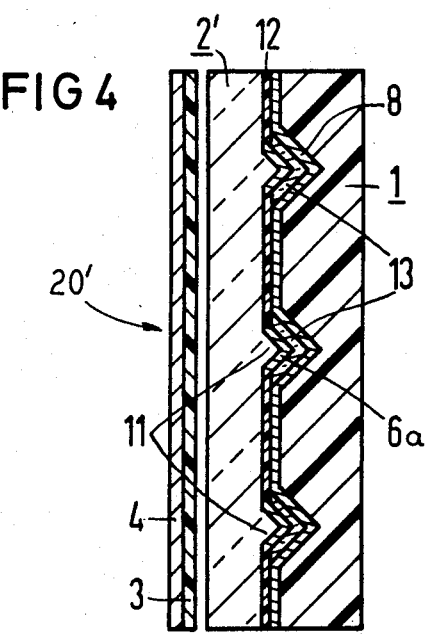
FIG. 4 is another embodiment of the display device in accordance with the present invention.

An embodiment 20' of the present invention is illustrated in FIG. 4. In this embodiment the structure provides a separate chamber 13 for fluid adjacent each of the notches or indentations 8 and each of the notches or indentations are sealed from adjacent notches or identations. In this structure, a rear plate 2' is provided with wedged-shaped projections 11 whose positions correspond to the notches 8 of the fluorescent plate 1 of the light trap. The plate 2' is connected by electrically insulating transparent adhesive layer 12 to the back surface of the fluorescent plate 1 with the projections 11 extending into the respective notches 8. The segment electrodes 6a are applied on the projections 11 so that a small chamber 13 are provided adjacent each of the segment electrodes 6' and the notches 8. In this embodiment, a fluid which is a suspension consisting of a black carrier medium and white particles is contained in each of the chambers 13. If one of the segment electrodes 6a is activated, the electrically charged particles of the fluid are deposited on the respective electrode and the previously absorbing notch or wall of the indentation becomes light scattering.

The suspension can also be composed in the following manner. The carrier fluid may be a transparent and have a clearly higher index of refraction than the fluorescent plate. The particles are likewise transparent and are similarly optically dense like the carrier fluid. For example, the index of refraction of the fluorescent plate could be approximately 1.5, the index of refraction for the carrier fluid could be approximately 1.8, and for the particles it could be 1.9. In this case, the carrier fluid and the particles suspended in the carrier fluid do not appear optically whereas the particles which are collected on the electrodes will act as scattering centers.

The proposed device and method readily permit a multi-color display. One need only merely subdivide the display into several adjacently disposed or tandemly arranged sections if one desires to produce images which have varying color components or constituents at different and/or at the same locations. If one provides the individual display sections with fluids whose precipitates themselves fluoresce or themselves deflect color-selectively, respectively, the production cost of a multi-color display is considerably less.

The invention is not restricted to the sample embodiments. A considerable latitude still exists from a structural point of view. Thus, the fluorescent member will, in deed, be predominantly a plate with mirrored or reflective edge surfaces 10 and will be contacted with the precipitate on its rear surface side. However, the fluorescent plate may have other shapes or configurations such as disclosed in the copending U.S. patent application Ser. No. 909,553 filed May 25, 1978 which was based on German O.S. 2,724,748 and which issued as U.S. Pat. No. 4,236,791 on Dec. 2, 1980. In addition, the provision of light exit windows on the front surface of the plate containing the fluorescent particles as disclosed in U.S. Pat. No. 4,142,781 is conceivable.

Although various minor modifications may be suggested by those versed in the art, it should be understood that we wish to embody within the scope of the patent granted hereon, all such modifications as reasonably and properly come within the scope of our contribution to the art.

We claim:

1. A display device for optically representing information, said device comprising a light trap including a fluorescent plate member having each of its edge surfaces being provided with a reflective layer and consisting of a material having an index of refraction greater than 1 and containing fluorescent particles, said plate member having a front surface and a rear surface when taken in the direction of viewing of the device by a viewer, said rear surface having notches at selected positions, said light trap collecting impinging ambient light by means of fluorescent scattering of the light into fluorescent light by the particles and subsequent internal reflection of the collecting light at the surfaces of the plate member; and means for selectively creating and erasing windows for coupling light from the plate member at each of the notches, said means including means for providing a pair of electrodes at each of the notches and means for providing an electrolyte between each pair of electrodes, said electrolyte being a material electrochemically forming a precipitate adjacent an electrode of a selected notch when a voltage is applied to the electrode and dissolving the precipitate when a counter voltage is applied thereto, said electrolyte being of a material electrochemically forming a precipitate selected from a group comprising metal precipitates and organic electrochromic precipitate with the metal precipitate being selected from a group consisting of silver, gold and nickel so that when an indication from a specific notch is desired, a voltage is applied to the electrode associated with the notch to electrochemically form a precipitate from the electrolyte to create a light decoupling window.

2. A display device according to claim 1, wherein one of the electrodes of each pair is disposed on the surface of its respective notch, and wherein the electrolyte material electrochemically forms a metal precipitate which is deposited on the surface of the notch to create a reflective light exit window.

3. A display device according to claim 1 wherein the precipitate electrochemically formed from the electrolyte has a property of reflecting only selected portions of the spectrum of the collected light in the fluorescent plate member.

4. A display device according to claim 1, wherein the means for providing an electrolyte adjacent each of the pairs of electrodes includes a back plate and means for spacing the back plate adjacent to the rear surface of the fluorescent plate to form a cavity for receiving the electrolyte, wherein the means for providing electrodes includes a light transparent coating on the surfaces of each of the notches of the rear surface of the fluorescent plate, and wherein the electrolyte received in the cavity adjacent the electrodes has an index of refraction approximately the same as the index of refraction of the fluorescent plate.

5. A display device according to claim 4, wherein the fluorescent plate is at least five times thicker than the combined thickness of the back plate and the means for spacing.

6. A display device according to claim 4, wherein filter means for blocking passage of the fluorescent light while passing the ambient exciting light is disposed adjacent a back surface of the back plate.

7. A display device according to claim 6, wherein a reflector is disposed on a back surface of the filter means.

8. A display device according to claim 1, wherein the means for providing an electrolyte adjacent each of the pairs of electrodes includes a back plate having wedge-shaped projections corresponding to the shape and position of the notches on the rear surface of the fluorescent plate, said back plate being mounted on the rear surface of the fluorescent plate with the wedged-shaped projections extending into the corresponding notches to form individual chambers for the electrolyte for the pairs of electrodes associated with said notches, said means for providing electrodes included providing electrode coatings on both the surfaces of each notch and the wedge-shaped projection to act on the electrolyte entrapped in the individual chambers.

9. A display device according to claim 8, wherein a filter means is disposed adjacent a back surface of the back plate for passing exciting ambient light and blocking passage of the fluorescent light.

10. A display device according to claim 9, which includes a reflector on a back surface of said filter means.

11. A display device for optically representing information, said device comprising a light trap including a fluorescent plate member having each of its edge surface being provided with a reflective layer and consisting of a material having an index of refraction greater than 1 and containing fluorescent particles, said plate member having a front surface and a rear surface when taken in the direction of viewing of the device by a viewer, said rear surface having rough surface areas at selected positions, said light trap collecting impinging ambient light by means of fluorescent scattering of the light into fluorescent light by the particles and subsequent internal reflection of the collected light at the surfaces of the plate member; and means for selectively creating and erasing windows for coupling light from the plate member at each of the rough surface areas, said means including means for providing a pair of electrodes at each of the rough surface areas with one electrode of each pair being disposed on said area and means for providing an electrolyte between each pair of electrodes, said electrolyte being of a material electrochemically forming a precipitate on a surface of the electrode on a selected rough surface area when a voltage is applied to the electrode and dissolving the precipitate when a counter voltage is applied thereto, said electrolyte being of a material electrochemically forming a precipitate selected from a group comprising metal precipitates and organic electrochromic participates with the metal precipitate being selected from a group consisting of silver, gold and nickel so that when an indication from a specific rough surface area is desired, a voltage is applied to the electrode associated with the specific rough surface area to electrochemically form a precipitate from the electrolyte to create a light decoupling window.

12. A display device according to claim 11, wherein the precipitate electrochemically formed from the electrolyte has a property of reflecting only selected portions of the spectrum of the collected light in the fluorescent plate member.

13. A display device according to claim 11, wherein the means for providing an electrolyte adjacent each of the pairs of electrodes includes a back plate and means for spacing the back plate adjacent to the rear surface of the fluorescent plate to form a cavity for receiving the electrolyte, wherein each of the electrodes on the rough surface areas of the back rear surface is a light transparent coating, and wherein the electrolyte received in the cavity adjacent the electrodes on the rough surface areas has an index of refraction which is approximately the same as the index of refraction of the fluorescent plate.

14. A display device according to claim 13, wherein the fluorescent plate is at least five time thicker than the combined thickness of the back plate and the means for spacing.

15. A display device according to claim 13, which includes filter means for blocking passage of fluorescent light while passing the ambient exciting light is disposed adjacent a back surface of the back plate.

16. A display device according to claim 15, wherein a reflector is disposed on a back surface of the filter means.

* * * * *